United States Patent
Müller et al.

(10) Patent No.: US 9,708,446 B2
(45) Date of Patent: Jul. 18, 2017

(54) CROSS-LINKING OF POLYETHER CARBONATE POLYOLS CONTAINING DOUBLE-BONDS, BY ADDING MERCAPTO-COMPOUNDS

(71) Applicant: Covestro Deutschland AG, Leverkusen (DE)

(72) Inventors: Thomas E. Müller, Aachen (DE); Christoph Gürtler, Köln (DE); Muhammad A. Subhani, Aachen (DE); Burkhard Köhler, Zierenberg (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/915,673

(22) PCT Filed: Aug. 25, 2014

(86) PCT No.: PCT/EP2014/067993
§ 371 (c)(1),
(2) Date: Mar. 1, 2016

(87) PCT Pub. No.: WO2015/032645
PCT Pub. Date: Mar. 12, 2015

(65) Prior Publication Data
US 2016/0200866 A1    Jul. 14, 2016

(30) Foreign Application Priority Data

Sep. 5, 2013   (EP) ..................................... 13183194

(51) Int. Cl.
C08F 2/46 (2006.01)
C08F 2/50 (2006.01)
C08G 61/04 (2006.01)
C08G 64/02 (2006.01)
C09D 169/00 (2006.01)
C09J 169/00 (2006.01)
C08G 64/34 (2006.01)
C08G 64/42 (2006.01)

(52) U.S. Cl.
CPC ......... *C08G 64/0291* (2013.01); *C08G 64/34* (2013.01); *C08G 64/42* (2013.01); *C09D 169/00* (2013.01); *C09J 169/00* (2013.01)

(58) Field of Classification Search
CPC .... C08G 64/42; C08G 64/0291; C08G 64/34; C09D 169/00; C09J 169/00
USPC ................... 522/100, 1, 113; 520/1
See application file for complete search history.

(56) References Cited

U.S. PATENT DOCUMENTS

| | | | |
|---|---|---|---|
| 3,280,078 A | 10/1966 | Hostettler et al. | |
| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | |
| 5,470,813 A | 11/1995 | Le-Khac | |
| 6,767,986 B2 | 7/2004 | Moethrath et al. | |
| 6,780,813 B1 | 8/2004 | Hofmann et al. | |
| 6,835,687 B2 | 12/2004 | Hofmann et al. | |
| 7,008,900 B1 | 3/2006 | Hofmann et al. | |
| 9,045,592 B2 | 6/2015 | Gürtler et al. | |
| 2006/0223973 A1* | 10/2006 | Hinz | C08G 64/34 528/196 |
| 2006/0224010 A1* | 10/2006 | Hinz | C08G 64/34 558/276 |
| 2012/0172537 A1* | 7/2012 | Arai | C08G 18/4866 525/415 |
| 2014/0107245 A1* | 4/2014 | Hofmann | C08G 64/183 521/172 |
| 2014/0228537 A1* | 8/2014 | Muller | C08G 64/34 528/405 |
| 2016/0194444 A1* | 7/2016 | Muller | C08G 64/34 521/178 |
| 2016/0200865 A1* | 7/2016 | Muller | C08G 64/183 523/400 |
| 2016/0229955 A1* | 8/2016 | Muller | C08G 64/0216 |
| 2016/0264727 A1* | 9/2016 | Hofmann | C08G 64/34 |

FOREIGN PATENT DOCUMENTS

| | | |
|---|---|---|
| CN | 102443150 A | 5/2012 |
| EP | 0700949 A2 | 3/1996 |
| EP | 0743093 A1 | 11/1996 |
| EP | 0761708 A2 | 3/1997 |
| EP | 1359177 A1 | 11/2003 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-2012032028 A1 | 3/2012 |

OTHER PUBLICATIONS

International Search Report for PCT/EP2014/067993 mailed Nov. 5, 2014.

First Office Action cited in related Chinese Patent Application for Invention No. 201480060360.9 (PCT/EP2014/067993) issued on Feb. 4, 2017, including English translation and cited references.

\* cited by examiner

*Primary Examiner* — Jessica E Whiteley
(74) *Attorney, Agent, or Firm* — K&L Gates LLP

(57) ABSTRACT

The present invention relates to a process for preparing mercapto-crosslinked polyethercarbonate and sees polyethercarbonate polyols containing double bonds being reacted with polyfunctional mercaptans and/or sulfur with the involvement of initiator compounds.

17 Claims, No Drawings

CROSS-LINKING OF POLYETHER CARBONATE POLYOLS CONTAINING DOUBLE-BONDS, BY ADDING MERCAPTO-COMPOUNDS

CROSS-REFERENCE TO RELATED APPLICATIONS

This application is a national stage application (under 35 U.S.C. §371) of PCT/EP2014/067993, filed Aug. 25, 2014, which claims benefit of European Application No. 13183194.3, filed Sep. 5, 2013, both of which are incorporated herein by reference in their entirety.

The present invention relates to a process for preparing mercapto-crosslinked polyethercarbonate and sees polyethercarbonate polyols containing double bonds being reacted with polyfunctional mercaptans and/or sulfur with the involvement of initiator compounds.

BACKGROUND OF THE INVENTION

As well as having a tailored functionality, modern plastics are also intended to do increased justice to environmental concerns. As well as by a general optimization of preparation processes, this can be achieved through the use of greenhouse gases, such as carbon dioxide, as building blocks for the synthesis of polymers. Accordingly, for example, a better environmental balance for the process can be obtained overall via the fixing of carbon dioxide. This path is being followed in the area of the production of polyethercarbonates, and has been a topic of intense research for more than 40 years (e.g., Inoue et al., Copolymerization of Carbon Dioxide and Alkylenoxide with Organometallic Compounds; Die Makromolekulare Chemie 130 (1969) 210-220). In one possible preparation variant, polyethercarbonate polyols are obtained by a catalytic reaction of epoxides and carbon dioxide in the presence of H-functional starter substances ("starters"). A general reaction equation for this is given in scheme (I):

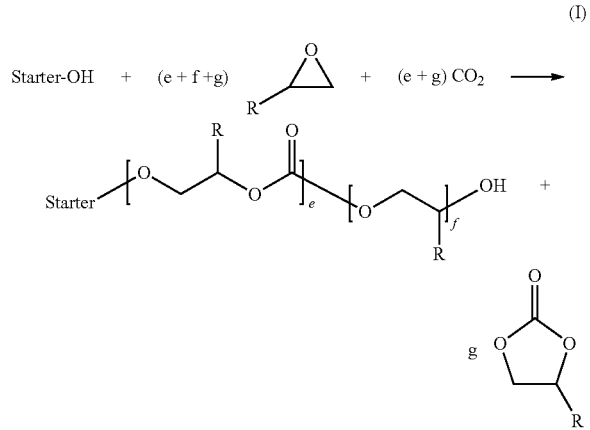

A further product, in this case an unwanted by product, arising alongside the polythercarbonate is a cyclic carbonate (for example, for R=$CH_3$, propylene carbonate).

As shown above, polyethercarbonate polyols have OH-functionalities, and this makes it possible in principle for relatively high molecular mass crosslinking products to be produced in further reactions, as by the addition of diisocyanates or polyisocyanates, for example. It would be desirable, however, to open further crosslinking pathways with different crosslinking reagents, which are able to provide different reaction kinetics and different product properties.

Journal of Polymer Science Part A: Polymer Chemistry 44-18 (2006) 5329-5336 describes terpolymers of propylene oxide, allyl glycidyl ether, and $CO_2$ which can be crosslinked by UV radiation. For many applications, however, this specific mode of curing is too slow.

The addition of mercaptoethanol to polyethercarbonates comprising vinylcyclohexene oxide as comonomer (thiol-ene click Chemistry) is described in Macromolecules 44 (2011) 9882-9886, This reaction has been utilized to provide polyethercarbonates with lateral hydroxy-group functionalization. Not described, on the other hand, is the curing of polyethercarbonates thus modified.

BRIEF SUMMARY OF THE INVENTION

It is therefore the object of this invention to provide fast-curing thermosets and coating systems comprising polyfunctional mercaptans and polyfunctional polyethercarbonate polyols that are liquid at room temperature, said thermosets and coating systems being obtained by radical crosslinking and exhibiting rapid and easy processability.

The object is achieved in accordance with the invention by a process for preparing mercapto-crosslinked polyether carbonates that is characterized in that polyethercarbonate polyols containing double bonds are reacted with polyfunctional mercaptans and/or sulfur with involvement of initiator compounds.

Surprisingly it has been found that specifically modified polyethercarbonate polyols containing double bonds can be reacted quickly and reproducibly with polyfunctional mercaptans to form high molecular mass polyethercarbonates which have good processing and product properties either as thermoset moldings or as coats.

This reaction regime for obtaining mercapto-crosslinked polyethercarbonates, the polyethercarbonate molecules being joined via sulfur-containing bridges, has emerged as particularly advantageous because the reactants used are liquid and of low viscosity even at low temperatures. In this way it is possible within a short time, and without great energy input, to produce a homogeneous reaction mixture which can be cured very quickly. Accordingly, within a simple and cost-effective reaction regime, three-dimensional crosslinked moldings or crosslinked thin coats can be obtained that have constant properties.

In the polyethercarbonate polyols which can be used in the process of the invention, the double bonds may be present in the main chain and/or in side chains.

Where not otherwise indicated, the team "double bond" in the context of the present invention means a C=C double bond.

The process presented above can be used to crosslink polyethercarbonate polyols containing double bonds, carrying double bonds with different electron densities, by means of polyfunctional mercaptans and/or sulfur. It is possible here in principle to conceive of two options, with the electron density of ethylene serving as a reference. Relatively electron-rich double bonds have a higher electron density, and relatively electron-poor double bonds a lower electron density, than ethylene. An electron density differing in this way within the double bond can be obtained through the use of different substituents on, adjacent to, or in allyl position relative to the double bond.

Within the crosslinking reaction of the invention, possibilities include both the crosslinking of polyethercarbonate polyols which carry electron-rich and/or electron-poor double bonds along the same polymer chain, and the crosslinking of polyethercarbonate polyol mixtures comprising polyethercarbonate polyols containing electron-rich double bonds and polyethercarbonate polyols containing electron-poor double bonds. The crosslinking of polyethercarbonate polyols containing electron-rich double bonds is preferred.

For example, electron-poor double bonds can be obtained by the use of substituents having –M or –I effect on the double bond. Substituents with a –M effect are capable of distributing electron density by mesomeric charge delocalization from the double bond onto the substituents. Substituents having a –I effect are capable of reducing the electron density in the double bond through an inductive effect. Examples of those substituents which lead to electron-poor double bonds are —F, —Cl, —Br, —I, —COH, —COX, —COOX; —C≡N, and/or —NO$_2$, where X in each case may be substituted or unsubstituted alkyl or substituted or unsubstituted aryl.

Accordingly, for example, electron-rich double bonds can be obtained through the use of substituents having +M or +I effect on the double bond. Substituents with a +M effect are capable of distributing electron density by mesomeric charge delocalization from the substituents onto the double bond. Substituents having a +I effect are capable of increasing the electron density in the double bond through an inductive effect. Suitable substituents are, for example, —OX, —OCOX, —X, —CH$_2$X and/or —CH=CHX, where X is substituted or unsubstituted alkyl, substituted or unsubstituted cycloalkyl or substituted or unsubstituted aryl. Such substituents may contribute to an increase in the electron density of the double bond, at, adjacent to, or in allyl position relative to a double bond.

The radical reaction of the invention with polyfunctional mercaptans can be carried out only with polyethercarbonate polyols containing electron-rich double bonds, only with polyethercarbonate polyols containing electron-poor double bonds, or with polyethercarbonate polyols containing both electron-poor and electron-rich double bonds. It is possible, moreover, to use mixtures of polyethercarbonate polyols containing electron-rich double bonds and polyethercarbonate polyols containing electron-poor double bonds. Preferred nevertheless are polyethercarbonate polyols or mixtures of polyethercarbonate polyols in which the molar amount of electron-rich double bonds is greater than the amount of electron-poor double bonds. Particularly preferred polyethercarbonate polyols are those containing only electron-rich double bonds.

The unsaturated polyethercarbonate polyols preferably contain at least two double bonds, more preferably more than two double bonds, very preferably 4 to 20 double bonds per molecule.

Polyfunctional mercaptans in the sense of the invention are organic compounds which contain at least two S—H-functionalities, preferably more than two thiol groups, very preferably 3 to 4 thiol groups per crosslinker molecule. Especially preferred are esters of 3-mercaptopropionic acid or of 2-mercaptoacetic acid with polyfunctional alcohols, such as ethylene glycol, propylene glycol, diethylene glycol, dipropylene glycol, butanediol, neopentyl glycol, hexanediol, glycerol, diglycerol, triglycerol, trimethylolethane, trimethylolpropane, ditrimethylolpropane, ditrimethylolethane, pentaerythritol, dipentaerythritol or sorbitol, or the ethoxylation or propoxylation products of these polyols, preferably trimethylolpropane or pentaerythritol. Also suitable as polyfunctional mercaptans are oligomers of 3-mercaptopropyltrimethoxysilane, of 3-mercaptopropyltriethoxysilane, of 3-mercaptopropylmethyldimethoxysilane or of 3-mercaptopropylmethyldiethoxysilane. Other suitable dimercaptans are dimercaptoalkanes, such as 1,2-dimercaptoethane, 1,6-dimercaptohexane or 1,12-dimercaptododecane. Other suitable dimercaptans are dimercaptoaromatics, such as 1,3-dimercaptobenzene, 1,4-dimercaptobenzene or 4,4'-dimercaptodiphenyl ether. Also suitable as polyfunctional mercaptans are mercaptoheterocycles, such as 2,5-dimercaptothiadiazole or 2,4,6-trimercapto-1,3,5-triazine. While in principle unlimited, the maximum number of mercapto groups within the polyfunctional mercaptans is judiciously less than 20, preferably less than 12 and more preferably less than 8. Within the process of the invention, this maximum number of mercapto groups per mercaptan may lead to an adequate crosslinking density with sufficient flexibility of the crosslinked product.

Initiator compounds in the sense of the invention are organic or metal-organic compounds which feature bonds that break down into radicals as a function of an external trigger, such as temperature exposure or irradiation with light, for example.

In an alternative embodiment, the polyethercarbonate containing double bonds is crosslinked using elemental sulfur and/or sulfur donors (also considered to be "sulfur" in the sense of the present invention) such as disulfur dichloride ($S_2Cl_2$), for example. Employed as initiator compound in this case are vulcanizing catalysts, such as 2-mercaptobenzothiazole or tetramethylthiuram disulfide, for example.

The present invention is described in more detail, in connection with further aspects and embodiments, below. They may be combined arbitrarily with one another, unless the opposite is clearly apparent from the context.

DETAILED DESCRIPTION OF THE INVENTION

In one embodiment of the process, the preparation of the polyethercarbonate polyols containing double bonds may comprise the following steps:
  (α) initially introducing a catalyst and
    (αα) a suspension medium which contains no H-functional groups and/or
    (αβ) an H-functional starter compound,
  (γ) metering in carbon dioxide and
  at least two epoxides, with at least one of the two epoxides having a double bond, or
  an epoxide and an unsaturated cyclic anhydride.

It is preferred here for this process to comprise, furthermore, the following step (β) between step (α) and step (γ):
  (β) metering in at least one epoxide, it being possible for the epoxide(s) metered in step (γ) to be the same as or different from the epoxide or epoxides metered in step (β).

It is preferred, furthermore, for the catalyst to be a DMC catalyst.

Surprisingly it has been found that through the choice of suitable unsaturated compounds in the synthesis of the polyethercarbonate polyol containing double bonds, it is possible to obtain polymers which have particularly favorable properties in comparison to the prior art. The polyethercarbonate polyols containing double bonds can be obtained reproducibly in a high yield and, as a result of the selected process regime, have a narrow molecular mass distribution and only a very small fraction of unreacted monomers. Through incorporation of cyclic anhydrides into the polymer chain formed, the polyethercarbonate polyol formed may comprise ester groups as well as ether groups and carbonate groups. Moreover, the polyethercarbonate polyols containing double bonds that are obtainable by this process can be radically crosslinked particularly advantageously with mercaptans, and so lead to mercapto-crosslinked polyethercarbonates having good service properties and easy processing. Without wishing to be bound by the theory, this easy processing in the context of the crosslinking comes about through the reactivity of the double bonds of the polyethercarbonate polyol with the mercaptans.

Furthermore, within one preferred embodiment of the process for preparing the polyethercarbonate polyols containing double bonds, the temperature in step (γ) may be greater than or equal to 60° C. and less than or equal to 150° C. This temperature range during the polymerization has proven particularly suitable for synthesis of the polyethercarbonate polyols containing double bonds with a sufficient reaction rate and with a high selectivity. In the range of lower temperatures, the reaction rate which comes about may only be inadequate, and, at higher temperatures, the fraction of unwanted byproducts may increase too greatly.

In the process of the invention which can be employed, monomers without unsaturated groups that can be used are epoxides having 2-45 carbon atoms and carrying no double bond. The epoxides having 2-45 carbon atoms are, for example, one or more compounds selected from the group encompassing ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-buteneoxide, epoxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, singly or multiply epoxidized fats as mono-, di- and triglycerides, epoxidized fatty acids, C1-C24 esters of epoxidized fatty acids, epichlorohydrin, glycidol, and derivatives of glycidol such as, for example, glycidol ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. As epoxides it is possible with preference to use ethylene oxide and/or propylene oxide, especially propylene oxide.

In addition, for preparing the polyethercarbonate polyols containing double bonds that can be used in accordance with the invention, an H-functional starter compound is used.

The suspension media which are used in step (α) for suspending the DMC catalyst contain no H-functional groups.

Suitable suspension media are all polar aprotic, weakly polar aprotic and nonpolar aprotic solvents, none of which contain any H-functional groups. As suspension medium it is also possible to use a mixture of two or more of these suspension media. The following polar aprotic solvents are mentioned here by way of example: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In an alternative embodiment, one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides are used as suspension media employed in step (α) for suspending the DMC catalyst. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one. 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3 ethyl-1H-isochromen-1-one, 3-(hydroxyrmethyl)-1H-isochromen-1-one, 9-hydroxy-1H,3H-benzo[de]isochromen-1-one, 6,7 dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl(oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxan-2,5-dione), D-lactide, DL-lactide, mesolactide and 3-methyl-1,4-dioxan-2,5-dione, 3-hexyl-6-methyl-1,4-dioxane-2,5-dione, 3,6-di(but-3-ene-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutan-1,3- diol carbonate, TMP-monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenyl amino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of epoxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides used are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-ene-1-yl]dihydrofuran-2,5-dione. Particular preference is given to succinic anhydride, maleic anhydride and phthalic anhydride.

The catalyst used for preparing the polyethercarbonate polyols with double bonds, of the invention, is preferably a DMC catalyst (double metal cyanide catalyst). In addition or as sole catalysts it is also possible to use other catalysts for the copolymerization of alkylene oxides and $CO_2$ active catalysts, such as, for example, zinc carboxylates or cobaltsalen complexes. Examples of suitable zinc carboxylates are zinc salts of carboxylic acids, especially dicarboxylic acids, such as adipic acid or glutaric acid. An overview of the known catalysts for the copolymerization of alkylene oxides and $CO_2$ is given for example by Chemical Communications 47 (2011) 141-163.

The double metal cyanide compounds present in DMC catalysts which can be used the process of the invention are the reaction products of water-soluble metal salts and water-soluble metal cyanide salts.

The term "terpolymerization" in the sense of the invention comprehends the polymerization of at least one epoxide, at least one comonomer having a double bond (epoxide and/or cyclic anhydride), and $CO_2$. Terpolymerization in the sense of the invention also includes, in particular, the copolymerization of a total of more than three monomers.

One preferred embodiment of the process which can be used in accordance with the invention for preparing polyethercarbonate polyols containing double bonds is characterized in that (α) [first activation stage] a suspension medium containing no H-functional groups, an H-functional starter compound, a mixture of a suspension medium which contains no H-functional groups and an H-functional starter compound, or a mixture of at least two H-functional starter compounds is introduced initially, and optionally water and/or other volatile compounds are removed by elevated temperature and/or reduced pressure, with the DMC catalyst being added to the suspension medium which contains no H-functional groups, the H-functional starter compound, the mixture of a suspension medium which contains no H-functional groups and the H-functional starter compound, or the mixture of at least two H-functional starter compounds, before or after the first activation stage, (β) [second activation stage] a portion (based on the total amount of the amount of epoxides used in steps (β) and (γ)) of one or more epoxides is added to the mixture resulting from step (α), it being possible for the addition of a portion of epoxide to take place optionally in the presence of $CO_2$ and/or inert gas (such as nitrogen or argon, for example), and it also being possible for step (β) to take place multiply, (γ) [polymerization stage] one or more epoxides, at least one unsaturated compound (epoxide and/or cyclic anhydride), and carbon dioxide are metered continually into the mixture resulting from step (β), and the epoxides used for the terpolymerization may be the same as or different from the epoxides used in step (β).

Step (α):

The addition of the individual components in step (α) may take place simultaneously or in succession in any order; preferably, in step (α), the DMC catalyst is introduced first, and, simultaneously or subsequently, the suspension medium which contains no H-functional groups, the H-functional starter compound, the mixture of a suspension medium which contains no functional groups and the H-functional starter compound, or the mixture of at least two H-functional starter compounds is added.

The subject of one preferred embodiment is a process in which in step (α) [first activation stage]

(α1) a reactor is charged with the DMC catalyst and a suspension medium and/or one or more H-functional starter compounds, (α2) an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

The subject of another preferred embodiment is a method in which in step (α) [first activation stage]

(α1) a suspension medium which contains no H-functional groups, an H-functional starter compound, a mixture of a suspension medium which contains no H-functional groups and an H-functional starter compound, or a mixture of at least two H-functional starter compounds is initially introduced, optionally under inert gas atmosphere, under an atmosphere of inert gas/carbon dioxide mixture, or under a pure carbon dioxide atmosphere, more preferably under inert gas atmosphere, and (α2) an inert gas, an inert gas/carbon dioxide mixture or carbon dioxide, more preferably inert gas, is introduced into the resulting mixture of the DMC catalyst and the suspension medium which contains no H-functional groups, the H-functional starter compound, the mixture of a suspension medium which contains no H-functional groups and the H-functional starter compound, or the mixture of at least two H-functional starter compounds, at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set the reactor by removal of the inert gas or carbon dioxide (with a pump, for example), it being possible for the double metal cyanide catalyst to be added to the suspension medium which contains no H-functional groups, the H-functional starter compound, the mixture of a suspension medium which contains no H-functional groups and the H-functional starter compound, or the mixture of at least two H-functional starter compounds in step (α1) or immediately thereafter in step (α2).

The DMC catalyst may be added in solid form or in suspension in a suspension medium and/or in an H-functional starter compound. If the DMC catalyst is added as a suspension, it is added preferably in step (α1) to the suspension medium and/or to the one or more H-functional starter compounds.

Step (β):

Step (β) of the second activation stage may take place in the presence of $CO_2$ and/or inert gas. Step (β) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. There are in principle different ways in which an inert gas/carbon dioxide atmosphere or a carbon dioxide atmosphere can be set, and in which one or more oxides can be metered. The supply pressure is preferably established by introduction of carbon dioxide, where the pressure (in absolute terms) is 10 mbar to 100 bar, preferably 100 mbar to 50 bar and especially preferably 500 mbar to 50 bar. The start of epoxide metering may take place at any supply pressure chosen beforehand. The total pressure (in absolute terms) of the atmosphere is set in step (β) preferably in the range from 10 mbar to 100 bar, preferably 100 mbar to 50 bar, and more preferably 500 mbar to 50 bar. Optionally, during or after the metering of the epoxide, the pressure is reregulated by introduction of further carbon dioxide, with the pressure (in absolute terms) being 10 mbar to 100 bar, preferably 100 mbar to 50 bar, and more preferably 500 mbar to 50 bar.

In one preferred embodiment, the amount of one or more epoxides used in the case of the activation in step (β) is 0.1 to 25.0 wt %, preferably 1.0 to 20.0 wt %, more preferably 2.0 to 16.0 wt %, based on the amount of suspension medium and/or H-functional starter compound used in step (α). The epoxide can be added in one step or stepwise in two or more portions.

In one particularly preferred embodiment of the invention, a portion (based on the total amount of the amount of epoxides used in steps (β) und (γ)) of one or more epoxides, in the case of the activation in step (β) [second activation stage], is added to the mixture resulting from step (α), it being possible for the addition of a portion of epoxide to take place optionally in the presence of $CO_2$ and/or inert gas. Step (β) may also take place multiply. The DMC catalyst is preferably used in an amount such that the amount of DMC catalyst in the resulting polyethercarbonate polyol containing double bonds is 10 to 10 000 ppm, more preferably 20 to 5000 ppm and most preferably 50 to 500 ppm.

In the second activation step, the epoxide may be added, for example, in one portion or over the course of 1 to 15 minutes, preferably 5 to 10 minutes. The duration of the second activation step is preferably 15 to 240 minutes, more preferably 20 to 60 minutes.

Step (γ):

The metering of the epoxide or epoxides, of the unsaturated compounds, also referred to below as monomers, and of the carbon dioxide may take place simultaneously, or alternately, or sequentially, and the overall amount of carbon dioxide may be added all at once or in a metered way over the reaction time. During the addition of the monomers it is possible for the $CO_2$ pressure, gradually or in steps, to be raised or lowered or left the same. Preferably, the total pressure is kept constant during the reaction by metered addition of further carbon dioxide. The metering of the monomers may take place simultaneously, alternatively, or sequentially to the metering of carbon dioxide. It is possible to meter the monomers at a constant metering rate or to raise or lower the metering rate continuously or in steps, or to add the monomers portionwise. The monomers are preferably added at constant metering rate to the reaction mixture. Where two or more epoxides are used for the synthesis of the polyethercarbonate polyols containing double bonds, the epoxides may be metered individually or as a mixture. The metering of the epoxides may take place simultaneously, alternately, or sequentially via in each case separate feeds (additions), or via one or more feeds, in which case the epoxides may be metered individually or as a mixture. Via the nature and/or sequence of the metering of the monomers and/or of the carbon dioxide it is possible to synthesize random, alternating, blocklike or gradientlike polyether carbonate polyols containing double bonds.

Preference is given to using an excess of carbon dioxide, relative to the calculated amount of carbon dioxide needed in the polyethercarbonate polyol containing double bonds, since an excess of carbon dioxide is an advantage, governed by the slowness of carbon dioxide to react. The amount of carbon dioxide can be specified by way of the total pressure. A total pressure (absolute) which has proven advantageous is the range from 0.01 to 120 bar, preferably 0.1 to 110 bar, more preferably from 1 to 100 bar, for the copolymerization for preparing the polyethercarbonate polyols containing double bonds. It is possible to supply the carbon dioxide to the reaction vessel continuously or discontinuously. This is dependent on the rate at which the monomers and the $CO_2$ are consumed and on whether the product is to include optionally $CO_2$-free polyether blocks or blocks with different $CO_2$ contents. The concentration of the carbon dioxide may also vary during the addition of the monomers. Depending on the reaction conditions selected, it is possible for the $CO_2$ to be introduced into the reactor in gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by
(i) sparging the reaction mixture in the reactor from below,
(ii) using a hollow-shaft stirrer,
(iii) a combination of metering forms (i) and (ii), and/or
(iv) sparging via the surface of the liquid, by using multilevel stirring elements.

Step (γ) is conducted, for example, at temperatures of 60 to 150° C., preferably from 80 to 120° C., most preferably from 90 to 110° C. If temperatures below 60° C. are set, the reaction ceases. At temperatures above 150° C., there is a sharp rise in the quantity of unwanted byproducts.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed monomers) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas sucked from the gas space above the reaction mixture and compressed, optionally mixed with fresh carbon dioxide and/or monomers, is introduced back into the reaction mixture as per (i), (ii), (iii) and/or (iv).

The pressure drop which comes about through incorporation of the carbon dioxide and the monomers into the reaction product in the terpolymerization is preferably balanced out by means of freshly metered carbon dioxide.

The monomers may be introduced separately or together with the $CO_2$, either via the liquid surface or directly into the liquid phase. The monomers are introduced preferably directly into the liquid phase, since this has the advantage of rapid mixing between the monomers introduced and the liquid phase, so preventing local concentration peaks of the monomers. The introduction into the liquid phase can be effected via one or more inlet tubes, one or more nozzles or one or more annular arrangements of multiple metering points, which are preferably arranged at the base of the reactor and/or at the side wall of the reactor.

The three steps (α), (β) and (γ) can be performed in the same reactor, or each can be performed separately in different reactors. Particularly preferred reactor types are stirred tanks, tubular reactors and loop reactors. If the reaction steps (α), (β) and (γ) are performed in different reactors, a different reactor type can be used for each step.

Polyethercarbonate polyols containing double bonds can be prepared in a stirred tank, in which case the stirred tank, depending on design and mode of operation, is cooled via the reactor shell, internal cooling surfaces and/or cooling surfaces within a pumped circulation system. Both in semi-batchwise application, in which the product is not removed until after the end of the reaction, and in continuous application, where the product is removed continuously, particular attention should be given to the metering rate of the monomers. It should be set so that, in spite of the inhibitory effect of the carbon dioxide, the monomers are depleted sufficiently rapidly by reaction. The concentration of free monomers in the reaction mixture during the second activation stage (step β) is preferably >0 to 100 wt %, more preferably >0 to 50 wt %, very preferably >0 to 20 wt % (based in each case on the weight of the reaction mixture).

The concentration of free monomers in the reaction mixture during the reaction (step γ) is preferably >0 to 40 wt %, more preferably >0 to 25 wt %, very preferably >0 to 15 wt % (based in each case on the weight of the reaction mixture).

Another possible embodiment for the copolymerization (step γ) is characterized in that one or more H-functional starter compounds as well are metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In one preferred embodiment, the catalyst/starter mixture activated in steps (α) and (β) is reacted further in the same reactor with the monomers and carbon dioxide. In another preferred embodiment, the catalyst/starter mixture activated in steps (α) and (β) is reacted in a different reaction vessel (for example, a stirred tank, tubular reactor or loop reactor) further with the monomers and carbon dioxide. In a further preferred embodiment, the catalyst/starter mixture prepared in step (α) is reacted in a different reaction vessel (for example, a stirred tank, tubular reactor or loop reactor) in steps (β) and (γ) with the monomers and carbon dioxide.

In the case of reaction in a tubular reactor, the catalyst/starter mixture prepared in step (α), or the catalyst/starter mixture activated in steps (α) and (β), and optionally further starters, and also the monomers and carbon dioxide, are pumped continuously through a tube. When a catalyst/starter mixture prepared in step (α) is used, the second activation stage in step (β) takes place in the first part of the tubular reactor, and the terpolymerization in step (γ) takes place in the second part of the tubular reactor. The molar ratios of the co-reactants vary according to the desired polymer.

In one process variant, carbon dioxide is metered in its liquid or supercritical form, in order to permit optimum miscibility of the components. The carbon dioxide can be introduced at the inlet of the reactor and/or via metering points which are arranged along the reactor, in the reactor. A portion of the monomers may be introduced at the inlet of the reactor. The remaining amount of the monomers is introduced into the reactor preferably via two or more metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. Preferably, the mixing elements mix $CO_2$ which is being metered in and the monomers with the reaction mixture. In an alternative embodiment, different volume elements of the reaction mixture are mixed with one another.

Loop reactors can likewise be used to prepared polyethercarbonate polyols containing double bonds. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("delay tube") in which residual concentrations of free monomers present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture preferably contains less than 0.05 wt % of monomers. The post-reaction time or the residence time in the downstream reactor is preferably 10 min to 24 h, especially preferably 10 min to 3 h.

The polyethercarbonate polyols containing double bonds that are obtainable in accordance with the invention preferably have an OH-functionality (i.e., average number of OH groups per molecule) of at least 0.8, preferably of 1 to 8, more preferably of 1 to 6, and very preferably of 2 to 4. In an alternative embodiment, the OH groups are saturated with suitable reagents, prior to the crosslinking of the polyethercarbonate polyols, to give crosslinked polyether carbonates, and so the resulting saturated polyethercarbonate polyol has an OH-functionality of less than 0.8, preferably less than 0.5 and more preferably less than 0.1. In specific applications, this leads to a lower polarity of the crosslinked polyethercarbonates obtained after crosslinking, thereby lowering, for example, the water absorption of the materials. Suitable reagents for the saturation of the OH-functionalities are methylating agents, for example.

The molecular weight of the resulting polyethercarbonate polyols containing double bonds is preferably at least 400, more preferably 400 to 1 000 000 g/mol and most preferably 500 to 60 000 g/mol. In an alternative embodiment, the molecular weight of the polyethercarbonate polyol prior to crosslinking is increased by extension with suitable reagents. Thus, for example, it is possible to prepare a difunctional polyethercarbonate polyol having an average molecular weight of ≥1000 to ≤20 000 and subsequently to extend it to an average molecular weight of ≥10 000 to ≤5 000 000. Extended polyethercarbonate polyols preferably have a molecular weight of ≥100 000 to ≤50 000 000 and more preferably of ≥500 000 to ≤5 000 000. Suitable reagents for extending the polyethercarbonate polyols are, for example, diisocyanates such as hexamethylene diisocyanate (HDI), methylenediphenyl diisocyanate (MDI) or toluene diisocyanate (TDI).

As suitable H-functional starter compounds (starters) it is possible to use compounds having H atoms that are active in respect of the alkoxylation. Groups which have active H atoms and are active in respect of the alkoxylation are, for example, —OH, —NH$_2$ (primary amines), —NH— (secondary amines), —SH and —CO$_2$H, preferably —OH and —NH$_2$, especially preferably —OH. As H-functional starter substance it is possible for there to be, for example, one or more compounds selected from the group encompassing mono- or polyhydric alcohols, polyfunctional amines, polyfunctional thiols, amino alcohols, thio alcohols, hydroxy esters, polyether polyols, polyester polyols, polyetherether polyols, polyethercarbonate polyols, polycarbonate polyols, polycarbonates, polyethyleneimines, polyetheramines (e.g. so-called Jeffamine® products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters which contain on average at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyor®™ products (USSC Co.).

The monofunctional starter compounds used may be alcohols, amines, thiols and carboxylic acids. The monofunctional alcohols used may be: Methanol, ethanol, 1-propanol, 2-propanol, 1-butanol, 2-butanol, tert-butanol, 3-buten-1-ol, 3-butyn-1-ol, 2-methyl-3-buten-2-ol, 2 methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphentyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances are dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide. Suitable polyether polyols formed from repeating propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E products from BASF SE; suitable homo-polypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 g/mol. Polyesters having a functionality of at least two can be used as polyester polyols. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

As H-functional starter substances it is additionally possible to use polycarbonate diols, especially those having a molecular weight $M_n$ in a range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples relating to polycarbonates are found for example in EP-A 1359177. As polycarbonate diols it is possible for example to use the Desmophen® C grades from Bayer MaterialScience AG, such as Desmophen® C 1100 or Desmophen® C 2200, for example.

In a further embodiment of the invention, it is possible to use polyethercarbonate polyols and/or polyetherestercarbonate polyols as H-functional starter substances. In particular it is possible to use polyetherestercarbonate polyols. These polyetherestercarbonate polyols used as H-functional starter substances may for this purpose be prepared in a separate reaction step beforehand.

The H-functional starter substances generally have an OH-functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula,

$$HO-(CH_2)_x-OH \qquad (II)$$

where x is a number from 1 to 20, preferably an integer from 2 to 20. Examples of alcohols as per formula (II) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols of formula (II) with ε-caprolactone, e.g. reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH-functionality of 2 to 4 and a molecular weight $M_n$ in the range from 62 to 4500 g/mol and more particularly a molecular weight $M_n$ in the range from 62 to 3000 g/mol.

Double metal cyanide (DMC) catalysts for use in the homopolymerization of epoxides are known in principle from the prior art (see, for example, U.S. Pat. No. 3,404,109, U.S. Pat. No. 3,829,505, U.S. Pat. No. 3,941,849 and U.S. Pat. No. 5,158,922), DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and permit the production of polyethercarbonates at very low catalyst concentrations. A typical example are the high-activity DMC catalysts described in EP-A 700 949, which in addition to a double metal cyanide compound (e.g. zinc hexacyanocobaltate(III)) and an organic complex ligand (e.g. tert-butanol) also include a polyether having a number-average molecular weight of more than 500 g/mol.

The DMC catalysts which can be used in accordance with the invention are preferably obtained by (1.) in the first step, reacting an aqueous solution of a metal salt with the aqueous solution of a metal cyanide salt in the presence of one or more organic complex ligands, e.g. an ether or alcohol, (2.) in the second step, using known techniques (such as centrifuging or filtering) to remove, the solid from the suspension obtained from (α), (3.) optionally, in a third step, washing the isolated solid with an aqueous solution of an organic complex ligand (e.g. by resuspending and subsequently again isolating by filtering or centrifuging), (4.) and subsequently drying the resulting solid, optionally after pulverizing, at temperatures of in general 20-120° C. and at pressures of in general 0.1 mbar to atmospheric pressure (1013 mbar), and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparing the double metal cyanide compounds preferably have a composition according to the general formula (III), $$M(X)_n \quad (III),$$

wherein

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (IV), $$M_r(X)_3 \quad (IV),$$

wherein

M is selected from the metal cations $Fe^{3+}$, $Al^{3+}$, $Co^{3+}$ and $Cr^{3+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (V), $$M(X)_s \quad (V),$$

wherein

M is selected from the metal cations $Mo^{4+}$, $V^{4+}$ and $W^{4+}$,

X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate.

or suitable metal salts preferably have a composition according to the general formula (VI), $$M(X)_t \quad (VI),$$

wherein

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts, Metal cyanide salts suitable for preparing the double metal cyanide compounds preferably have a composition according to the general formula (VII)

$$(Y)_a M'(CN)_b (A)_c \quad (VII),$$

wherein

M' is selected from one or more metal cations from the group consisting of Fe(I), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and a, b and c are integral numbers, the values for a, b and c being selected such as to ensure the electroneutrality of the metal cyanide salt; a is preferably 1, 2, 3 or 4; b is preferably 4, 5 or 6; c preferably possesses the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VIII)

$$M_x[M'_{x'}(CN)_y]_z \quad (VIII),$$

in which M is defined as in the formulae (III) to (VI) and

M' is defined as in formula (VII), and x, x', y and z are integral and are selected such as to ensure the electron neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, α, β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligands by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, for example, water-soluble byproducts, such as potassium chloride, can be removed from the catalyst that can be used in accordance with the invention. The amount of the organic complex ligand in the aqueous wash solution is preferably between 40 and 80 wt %, based on the overall solution.

Optionally in the third step the aqueous wash solution is admixed with a further complex-forming component, preferably in a range between 0.5 and 5 wt %, based on the overall solution.

Moreover, it is advantageous to wash the isolated solid more than once. In a first washing step (3.-1), washing takes place preferably with an aqueous solution of the unsaturated alcohol (for example by resuspension and subsequent reisolation by filtration or centrifugation), in order thereby to remove, for example, water-soluble byproducts, such as potassium chloride, from the catalyst that can be used in accordance with the invention. The amount of the unsaturated alcohol in the aqueous wash solution is more preferably between 40 and 80 wt %, based on the overall solution of the first washing step. In the further washing steps (3.-2), either the first washing step is repeated one or more times, preferably from one to three times, or, preferably, a non-aqueous solution, such as a mixture or solution of unsaturated alcohol and further complex-forming component (preferably in the range between 0.5 and 5 wt %, based on the total amount of the wash solution of step (3.-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

The unsaturated comonomers may be distributed randomly or in blocks in the double bond-containing polyethercarbonate polyols. Gradient polymers can also be used.

In a further embodiment of the method, the unsaturated cyclic anhydrides metered in step (γ) may be selected from the group encompassing 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride or octadecenylsuccinic anhydride. This group of unsaturated cyclic anhydrides carries electron-rich, unsaturated double bonds, which may contribute to a reaction in the context of the initiator-activated crosslinking reaction with mercaptans. In this way, as a result of the crosslinking reaction with polyfunctional mercaptans, homogeneous films and moldings can be provided within a short time.

Furthermore, the unsaturated cyclic anhydrides metered in step (γ) may conform to the following formulae (IX), (X) and (XI):

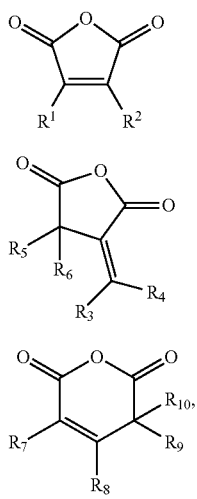

where $R^1$-$R^{10}$ independently of one another are hydrogen, halogen, C1-C22 alkyl or C6-C14 aryl radicals. In a further embodiment $R^1$-$R^2$ may only be hydrogen and $R^3$-$R^{10}$ may be hydrogen, C1-C22 alkyl or C6-C14 aryl radicals. Preferred compounds of the formula (IX), (X) (XI) are maleic anhydride, halogen- or alkyl-substituted maleic anhydrides, and itaconic anhydride. With particular preference, maleic anhydride and itaconic anhydride can be used. This group of unsaturated cyclic anhydrides carries electron-poor, unsaturated double bonds, which are less favorable. However, they can be reacted, alone or together with electron-rich unsaturated double bonds, with mercaptans.

In a further characteristic of the method, the epoxides with double bond metered in step (γ) may have been selected from the group encompassing allyl glycidyl ether, vinylcyclohexene oxide, cyclooctadiene monoepoxide, cyclododecatriene monoepoxide, butadiene monoepoxide, isoprene monoepoxide and/or limonene oxide. Common to this group of epoxides is that they carry electron-rich double bonds, leading to polyethercarbonate polyols containing electron-rich double bonds. This is governed by the +M or +I substituents adjacent or in allyl position relative to the double bond of the epoxides used. The increase in the electron density in the double bonds of the polymer may contribute to more rapid reaction in the context of the initiator-activated crosslinking reaction with mercaptans. In this way, as a result of the crosslinking reaction with polyfunctional mercaptans, homogeneous films and moldings can be provided within a short time.

In a further embodiment of the method of the invention, the polyethercarbonate polyol containing double bonds may have a fraction of unsaturated comonomers of greater than or equal to 0.1 mol % and less than or equal to 50 mol %. In the course of the further functionalization of the double bond-containing polyethercarbonate polyols used in accordance with the invention, the provision of a defined number of functionalizing possibilities that is situated within the range specified above has proven particularly advantageous. Approximately every 2nd to every 1000th monomer unit within the polymer chain in the polyethercarbonate polyol used in accordance with the invention carries an unsaturated group and, accordingly, is able to react in the course of a reaction with mercaptans. In this way it is possible to obtain particularly stable, mercapto-crosslinked polyethercarbonates. The fraction of unsaturated comonomers in the polyethercarbonate polyols for crosslinking may further be preferably greater than or equal to 0.5 mol % and less than or equal to 15 mol %, more particularly greater than or equal to 1.0 mol % and less than or equal to 10 mol %.

In one embodiment of the method, the polyfunctional mercaptan may conform to the formula (XII) below:

$$HS-X1+SH)_n \quad (XII),$$

where X1 is a heteroatom-containing or non-heteroatom-containing C2-C30 araliphatic, aliphatic or cycloaliphatic radical having a valency of two or more, and n is an integer ≥1.

In a further embodiment of the method, the polyfunctional mercaptans may have been selected from the group of the diesters, triesters or tetraesters of trimethylolpropane, of trimethylolethane, of glycerol and of pentaerythritol with 3-mercaptopropionic acid and/or 2-mercaptoacetic acid. This aforesaid group of polyfunctional mercaptans specifically has proven particularly suitable with regard to the reaction rate in the reaction with the double bond-containing polyethercarbonate polyols that can be used in accordance with the invention. The reaction takes place quantitatively even at low temperatures, to give homogeneous products having preferential mechanical properties.

In a further embodiment of the method of the invention, the polyfunctional mercaptan can be pentaerythritol tetra-3-mercaptopropionate. The pentaerythritol tetra-3-mercaptopropionate may lead to particularly long-lived and stable, mercapto-crosslinked polyethercarbonates in the context of the method of the invention. It is highly probable that the high stability is based on the steric circumstances of the polyfunctional mercaptan. Furthermore, a particularly favorable HOMO/LUMO position of the crosslinker in relation to the double bonds may also come about in the polyethercarbonate polyol, and may contribute to a rapid and complete reaction, In a further embodiment of the method, the initiator compound may have been selected from the group of the photoinitiators, metal-activated peroxides and/or redox initiators. In order to raise the rate of reaction between the polyfunctional mercaptans and the double bonds of the polyethercarbonate polyol, one or more initiator compounds may be added to the reaction mixture. The radical addition in this context may be accelerated with initiators which are described in T. Myers, N. Kirk-Othmer, Encyclopedia of Chemical Technology (5th Edition) (2005), 14 274-311 or in J. C. Bevington, Makromolekulare Chemie, Macromolecular Symposia 10-1, (1987) 89, photoinitiators which are described in J. P. Fouassier, X. Allonas, J. Lalevee; C. Dietlin, Photochemistry and Photophysics of Polymer Materials (2010) 351-419, metal-activated peroxides which are described in C. Sma, Angewandte Makromolekulare Chemie 9 (1969) 165-181, or with redox initiators which are described in G. S. Misra; U. D. N. Bajpai Progress in Polymer Science 8 (1-2) (1982) 61-131.

The use of photoinitiators is preferred. Photoinitiators in the sense of the invention are, for example, bis(2,4,6-trimethylbenzoyl)phenylphosphine oxide, diphenylmesitoylphosphine oxide, camphorquinone, isopropylthioxanthone, Michler's ketone, benzophenone, benzoin methyl ether, dimethoxyphenylacetophenone or 2,2-dimethyl-2-hydroxyacetophenone.

The radical initiators can be used in amounts of greater than or equal to 0.01 wt % and less than or equal to 2 wt %, based on the polyethercarbonate polyol. Redox initiators here are a mixture of an oxidizing substance and a reducing substance. Photoinitiators of the type II require the addition of a hydrogen donor, such as an amine or a mercapto compound, and the polyfunctional mercaptans may also fulfil this function.

In an additional embodiment of the method, the initiator compound may be bis(2,4,6-trimethylbenzoyl)phenylphosphine oxide, 2,4,6-trimethylbenzoyldiphenylphosphine oxide, camphorquinone, 4-isopropyl-9-thioxanthenone, 2-benzoyl-3-methyl-3-ethyloxaziridine, bis(2,6-dichlorobenzoyl)-4-n-propylphenylphosphine oxide and/or bis($\eta^5$-2,4-cyclopentadien-1-yl)bis(2,6-difluoro-3-(1H-pyrrol-1-yl)phenyltitanium. For the uniform and controlled crosslinking of double bond-containing polyethercarbonate polyols with polyfunctional mercaptans, bis(2,4,6-trimethylbenzoyl)phenylphosphine oxide has proven particularly suitable. This initiator can be activated simply and reproducibly under the reaction conditions selected, and, after the end of reaction, yields waste products which have no substantial influence on the mechanical properties of the mercaptan-crosslinked polyethercarbonates.

Within one preferred characteristic of the method, the ratio of double bonds to mercapto groups may be greater than or equal to 1:1 and less than or equal to 10:1. This ratio of the double bonds in the polyethercarbonate polyol to mercapto groups in the polyfunctional mercaptans has proven advantageous in order to achieve extremely stable and long-lived, three-dimensional moldings or coats. Lower ratios are not advantageous, since there may be residual functionality left over as a result of unreacted polyfunctional mercaptans in the mercapto-crosslinked polyethercarbonate. This may have consequences for the stability of the products in storage. Higher ratios, in contrast, may be disadvantageous, since they may result in inadequate stabilization through the small fraction of crosslinker.

In a further embodiment of the method, the molar ratio of the double bonds in the polyethercarbonate polyol to mercapto groups used may be greater than or equal to 1:1 and less than or equal to 2:1. This molar ratio of reactive double bonds on the polymer scaffold to crosslinking mercapto groups has proven particularly favorable in respect of sufficiently rapid crosslinking and a sufficiently high crosslinking density of the mercapto-crosslinked polyethercarbonate. A smaller ratio may lead only to incomplete reaction and to low strength in the crosslinked end products. A higher ratio may possibly adversely affect the elasticity of the products.

Further in accordance with the invention is a mercapto-crosslinked polyethercarbonate obtainable by the reaction of double bond-containing polyethercarbonate polyols and polyfunctional mercaptans by the method of the invention. The mercapto-crosslinked polyethercarbonates obtainable by the method of the invention can be prepared relatively simply and exhibit reproducible mechanical properties and excellent stability. This may be attributed to an advantageous viscosity of the reactants used and to complete and controllable crosslinking reaction between the polyfunctional mercaptans and the double bond-containing polyethercarbonate polyols.

In a further embodiment, the mercapto-crosslinked polyethercarbonate may be obtainable by initiating the reaction by UV irradiation with an intensity of greater than or equal to 5 W/cm$^2$ and less than or equal to 40 W/cm$^2$. For the uniform crosslinking of the polyfunctional mercaptans with the double bond-containing polyethercarbonate polyols, the UV-induced cleavage of the initiator compounds has proven particularly advantageous. Governed by the initiation of the radical reaction with only moderate energy densities, the crosslinking may take place homogeneously throughout the reaction mixture. In this way a constant crosslinking density of the polymer can be achieved. Lower energy densities may result in only incomplete cleavage of the initiator compounds, whereas higher energy densities may cause an unwanted reaction of the individual double bonds of the polyethercarbonate polyol. For initiating the crosslinking reaction it may be useful to utilize commercial mercury vapor lamps with a wavelength spectrum of 180-580 nm. It has emerged as particularly advantageous to use only the wavelength range of 180-320 nm, by means of an optical filter, to initiate the radical crosslinking.

The mercapto-crosslinked polyethercarbonates obtainable by the method of the invention can be used as sealant, adhesive, coating material, or thermoset molding. The mercapto-crosslinked polyethercarbonates of the invention can be used as rubbers, sealants, adhesives, coating materials, or thermoset moldings. They are obtainable from easy-to-process liquid starting products, and in contrast to unsaturated polyesters, contain no low molecular mass monomers, such as styrene, vinyl ethers or vinyl esters. Furthermore, the mixtures to be cured contain no solvent. The mixtures of double bond-containing polyethercarbonate polyols, polyfunctional mercaptans and initiators can be used in casting or RIM operations. The mixtures of double bond-containing polyethercarbonate polyols, polyfunctional mercaptans and initiators, and also their cured reaction products, can also be used for printing inks, lithography or stereolithography (rapid prototyping).

Additionally in accordance with the invention is a molding having a layer comprising a mercapto-crosslinked polyethercarbonate. The mercapto-crosslinked polyethercarbonates which can be prepared in accordance with the invention may be used in particular for constructing mechanically stable coats on moldings, since the polyethercarbonate polyols of the invention can be placed simply and reproducibly on moldings, and a further crosslinking reaction, with radical initiators, for example, can be carried out easily and reproducibly. This may result in particular from the fact that at room temperature the reactants used are liquid and are accordingly easy to process.

For further advantages and features of the above-described molding, reference is hereby made explicitly to the elucidations in connection with the mercapto-crosslinked polythercarbonates of the invention and with the method of the invention, in relation to their crosslinking. Inventive features and advantages of the polyethercarbonate polyols are also intended to be applicable for the method of the invention and for the moldings of the invention, and are considered to be disclosed as such, and vice versa. The invention also encompasses all combinations of at least two features disclosed in the description and/or in the claims.

EXAMPLES

Substances:
H-functional starter substance (starter) used:
PET-1 difunctional poly(oxypropylene)polyol having an OH number of 112 mg$_{KOH}$/g
Epoxide used that carries no double bonds:
PO propylene oxide
Comonomer used:
AGE allyl glycidyl ether, containing electron-rich double bonds
Polyfunctional mercaptan used:
pentaerythritol tetra-3-mercaptopropionate Radical initiator used:
bis(2,4,6-trimethylbenzoyl)phenylphosphine oxide (Irgacure 819)

The DMC catalyst was prepared according to example 6 of WO-A 01/80994.

Methods:

OH Number (Hydroxyl Number)

The OH number (hydroxyl number) was determined in a method based on DIN 53240-2, but using N-methylpyrrolidone instead of THF/dichloromethane as solvent. Titration took place with 0.5 molar ethanolic KOH solution, with endpoint recognition by means of potentiometry. The test substance used was certified castor oil. The statement of unit in "$mg_{KOH}/g$" relates to mg[KOH]/g[polyethercarbonate polyol].

Gel Permeation Chromatography

The number-average $M_n$, and the weight-average $M_w$ molecular weights of the resultant polyethercarbonate polyols were determined by means of gel permeation chromatography (GPC). The procedure was that of DIN 55672-1: "Gel permeation chromatography, Part 1-Tetrahydrofuran as eluent" (SECurity GPC system from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.

Rheology

The viscosity of the product mixture was determined using a Physica MCR 501 rheometer from Anton Paar at 25° C., using a cone/plate configuration with a cone diameter of 25 mm and with a distance of 0.05 mm between cone and plate. The shear rate was increased over 10 minutes from 0.01 to 1000 1/s. A value was taken every 10 seconds. The result reported is the viscosity as the average of the total of 60 measurement values.

$^1$H-NMR Spectroscopy

The sample was dissolved in deuterated chloroform and measured on a Bruker spectrometer (AV400, 400 MHz).

Preparation of the Unsaturated Polyethercarbonate Polyols:

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The incidence of an elevated evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor. The incidence of evolution of heat in the reactor, brought about by the continuous reaction of propylene oxide and of the compounds containing double bonds during the reaction [polymerization stage], led to a fall in the power of the heating jacket to about 8% of the maximum heating power. As a result of the regulation, the heating power varied by ±5% of the maximum heating power.

The stirrer used in the examples was a hollow-shaft stirrer in which the gas was introduced into the reaction mixture via a hollow stirrer shaft. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was sucked in and introduced through the hollow shaft of the stirrer into the reaction mixture.

a) The terpolymerization of propylene oxide, unsaturated epoxides and/or cyclic anhydrides and $CO_2$ results not only in the cyclic propylene carbonate but also in the double bond-containing polyethercarbonate polyol comprising on the one hand polycarbonate units shown in formula (XIII)

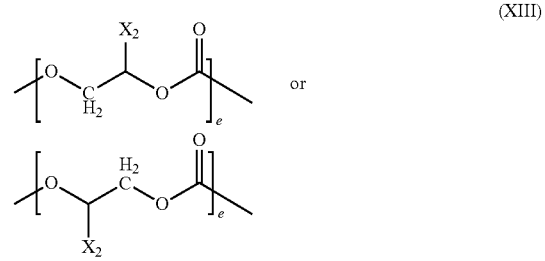

(XIII)

and on the other hand polyether units shown in formula (XIV)

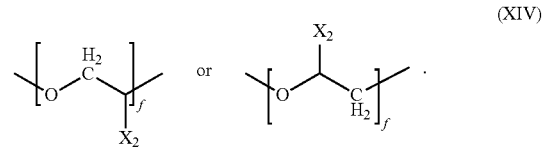

(XIV)

In this formula, X2 is either methyl or a side chain originating from the reaction of the unsaturated epoxide. By incorporation of cyclic anhydrides into the polymer chain formed, the polyethercarbonate polyol formed may include not only ether groups and carbonate groups but also ester groups.

The reaction mixture was characterized by $^1$H-NMR spectroscopy and gel permeation chromatography.

The ratio of the amount of cyclic propylene carbonate to polyethercarbonate polyol (selectivity; ratio g/e) and also the fraction of unreacted monomers (propylene oxide $R_{PO}$, allyl glycidyl ether $R_{AGE}$ in mol %) were determined by means of $^1$H-NMR spectroscopy.

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyethercarbonate polyol (ratio e/f) and also the molar fraction of allyl glycidyl ether incorporated into the polymer were determined by means of $^1$H-NMR spectroscopy.

The relevant resonances in the $^1$H-NMR spectrum (based on TMS=0 ppm) which were used for integration are as follows:

| Signal | Shift in ppm | Designation | Area corresponds to number of H atoms |
|---|---|---|---|
| I1 | 1.10–1.17 | $CH_3$ group of polyether units | 3 |
| I2 | 1.25–1.34 | $CH_3$ group of polycarbonate units | 3 |
| I3 | 1.45–1.48 | $CH_3$ group of cyclic carbonate | 3 |
| I4 | 2.95–3.00 | CH groups of free unreacted propylene oxide | 1 |
| I5 | 5.83–5.94 | CH group of the double bond obtained in the polymer via the incorporation of allyl glycidyl ether | 1 |
| I6 | 2.85–2.90 | CH groups of the free unreacted allyl glycidyl ether | 1 |

The figure reported is the molar ratio of the amount of cyclic propylene carbonate to carbonate units in the polyether carbonate polyol (selectivity g/e) and the molar ratio of carbonate groups to ether groups in the polyether carbonate polyol (e/f), and also the fractions of the unreacted propylene oxide (in mol %) and maleic anhydride (in mol %).

Taking account of the relative intensities, the values were calculated as follows:

Molar ratio of the amount of cyclic propylene carbonate to carbonate units in the polyether carbonate polyol (selectivity g/e):

$$g/e = I3/I2$$

Molar ratio of carbonate groups to ether groups in the polyethercarbonate polyol (e/f):

$$e/f = I2/I1$$

The fraction of carbonate units in the repeating units of the polyethercarbonate polyol obtained from the copolymerization of propylene oxide and $CO_2$:

$$C_{carbonate} = [(I2/3)/((I1/3)+(I2/3))] \times 100\%$$

The molar proportion of the unconverted propylene oxide ($R_{PO}$ in mol %) based on the sum total of the amount of propylene oxide used in the activation and the copolymerization is calculated by the formula:

$$R_{PO} = [(I4)/((I1/3)+(I2/3)+(I3/3)+(I4))] \times 100\%$$

The fraction of carbonate units in the repeating units of the polyethercarbonate polyol obtained from the terpolymerization of propylene oxide, allyl glycidyl ether and $CO_2$:

$$C_{carbonate} = [(I2/3)/((I1/3)+(I2/3)+(I5))] \times 100\%$$

The fraction of double bonds resulting from the incorporation of allyl glycidyl ether in the repeating units of the polyethercarbonate polyol:

$$A_{double\ bond} = [(I5)/((I1/3)+(I2/3)+(I5))] \times 100\%$$

The molar proportion of the unconverted propylene oxide ($R_{PO}$ in mol %) based on the sum total of the amount of propylene oxide used in the activation and the copolymerization is calculated by the formula:

$$R'_{PO} = [(I4)/((I1/3)+(I2/3)+(I3/3)+(I4)+(I5)+(I6))] \times 100\%$$

The molar proportion of the unconverted allyl glycidyl ether ($R_{AGE}$ in mol %) based on the sum total of the amount of allyl glycidyl ether used in the activation and the copolymerization is calculated by the formula:

$$R_{AGE} = [(I6)/((I1/3)+(I2/3)+(I3/3)+(I4)+(I5)+(I6))] \times 100\%$$

Preparation of the Polyethercarbonate Polyols

Example 1: Terpolymerization of a Mixture of Propylene Oxide, Allyl Glycidyl Ether (4.3 mol %) and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, in the course of which a slight drop in temperature was observed, and following re-attainment of a temperature of 130° C., 2.0 g of a monomer mixture (8.2 wt % of allyl glycidyl ether [corresponding to 4.3 mol %] in solution in propylene oxide) were metered in by means of an HPLC pump (1 ml/min). The reaction mixture was stirred (800 rpm) at 130° C. for 20 min. The addition of 2.0 g of a monomer mixture was repeated a second and third time.

[Polymerization Stage]

After cooling to 100° C. had taken place, a further 53.9 g of the monomer mixture (8.2 wt % of allyl glycidyl ether [corresponding to 4.3 mol %] in solution in propylene oxide) were metered in using an HPLC pump (1 ml/min), the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide ($R'_{PO}$=0%) and allyl glycidyl ether ($R_{AGE}$=0%) monomers used.

| Selectivity | g/e | 0.05 |
|---|---|---|
| | e/f | 0.23 |
| $C'_{carbonate}$ in % | | 19.3 |
| $A_{double\ bond}$ in % | | 2.6 |
| Molecular weight in g/mol | $M_n$ | 5428 |
| Polydispersity | | 1.2 |
| OH number in $mg_{KOH}/g$ | | 26.0 |
| Viscosity in mPa · s | | 4600 |

Example 2: Terpolymerization of a Mixture of Propylene Oxide, Allyl Glycidyl Ether (8.3 mol %) and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, in the course of which a slight drop in temperature was observed, and following re-attainment of a temperature of 130° C., 2.0 g of a monomer mixture (15.2 wt % of allyl glycidyl ether [corresponding to 8.3 mol %] in solution in propylene oxide) were metered in by means of an HPLC pump (1 ml/min). The reaction mixture was stirred (800 rpm) at 130° C. for 20 min. The addition of 2.0 g of a monomer mixture was repeated a second and third time.

[Polymerization Stage]

After cooling to 100° C. had taken place, a further 54.0 g of the monomer mixture (15.2 wt % of allyl glycidyl ether [corresponding to 8.3 mol %] in solution in propylene oxide) were metered in using an HPLC pump (1 ml/min), the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide ($R'_{PO}$=0%) and allyl glycidyl ether ($R_{AGE}$=0%) monomers used.

| Selectivity | g/e | 0.06 |
|---|---|---|
|  | e/f | 0.25 |
| $C'_{carbonate}$ in % |  | 20.3 |
| $A_{double\ bond}$ in % |  | 6.4 |
| Molecular weight in g/mol | $M_n$ | 5446 |
| Polydispersity |  | 2.0 |
| OH number in $mg_{KOH}/g$ |  | 26.9 |
| Viscosity in mPa · s |  | 4000 |

Example 3: Terpolymerization of a Mixture of Propylene Oxide, Allyl Glycidyl Ether (16.4 mol %) and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, in the course of which a slight drop in temperature was observed, and following re-attainment of a temperature of 130° C., 2.0 g of a monomer mixture (30.4 wt % of allyl glycidyl ether [corresponding to 16.4 mol %] in solution in propylene oxide) were metered in by means of an HPLC pump (1 ml/min). The reaction mixture was stirred (800 rpm) at 130° C. for 20 min. The addition of 2.0 g of a monomer mixture was repeated a second and third time.

[Polymerization Stage]

After cooling to 100° C. had taken place, a further 54.0 g of the monomer mixture (30.4 wt % of allyl glycidyl ether [corresponding to 16.4 mol %] in solution in propylene oxide) were metered in using an HPLC pump (1 ml/min), the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide ($R'_{PO}$=0%) and allyl glycidyl ether ($R_{AGE}$=0%) monomers used.

| Selectivity | g/e | 0.09 |
|---|---|---|
|  | e/f | 0.28 |
| $C'_{carbonate}$ in % |  | 22.2 |
| $A_{double\ bond}$ in % |  | 13.6 |
| Molecular weight in g/mol | $M_n$ | 5432 |
| Polydispersity |  | 1.8 |
| OH number in $mg_{KOH}/g$ |  | 28.6 |
| Viscosity in mPa · s |  | 4800 |

Example 4 (Comparative)

Copolymerization of Propylene Oxide and $CO_2$ Without Addition of Allyl Glycidyl Ether

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated a second and third time.

[Polymerization Stage]

After cooling to 100° C., a further 54.0 g of propylene oxide were metered in using an HPLC pump (1 ml/min), in the course of which the $CO_2$ pressure was kept constant at 15 bar. The reaction mixture was subsequently stirred at 100° C. for 2 hours more. The reaction was halted by cooling of the reactor with ice-water.

The resulting mixture was free from propylene oxide ($R_{PO}$=0%).

| Selectivity | g/e | 0.09 |
|---|---|---|
|  | e/f | 0.26 |
| $C_{carbonate}$ in % |  | 20.7 |
| $A_{double\ bond}$ in % |  | — |
| Molecular weight in g/mol | $M_n$ | 5495 |
| Polydispersity |  | 1.4 |
| OH number in $mg_{KOH}/g$ |  | 26.2 |
| Viscosity in mPa · s |  | 7900 |

Preparation of the Mixtures of Polyethercarbonate Polyols with Polyfunctional Mercaptan and Photoinitiator Example 1A: Mixture of Terpolymer, Electron-Rich, 2.6 mol % Allyl Glycidyl Ether+Polyfunctional Mercaptan In a glass flask darkened using aluminum foil, 3 g of the polyethercarbonate polyol from example 1 were mixed with the equimolar amount (SH based on double bonds) of pentaerythritol tetra-3-mercaptopropionate (0.175 g) and 0.003 g of bis(2,4,6-trimethylbenzoyl)phenylphosphine oxide.

Example 2A: Mixture of Terpolymer, Electron-Rich, 6.4 mol % Allyl Glycidyl Ether+Polyfunctional Mercaptan In a glass flask darkened using aluminum foil, 3 g of the polyethercarbonate polyol from example 2 were mixed with the equimolar amount (SH based on double bonds) of pentaerythritrol tetra-3-mercaptopropionate (0.35 g) and 0.003 g of bis(2,4,6-trimethylbenzoyl)phenylphosphine oxide.

Example 3A: Mixture of Terpolymer, Electron-Rich, 13.6 mol % Allyl Glycidyl Ether+Polyfunctional Mercaptan In a glass flask darkened using aluminum foil, 3 g of the polyethercarbonate polyol from example 3 were mixed with the equimolar amount (SH based on double bonds) of pentaerythritrol tetra-3-mercaptopropionate (0.7 g) and 0.003 g of bis(2,4,6-trimethylbenzoyl)phenylphosphine oxide.

Example 4A (Comparative): Copolymer, Without Double Bonds+Polyfunctional Mercaptan In a glass flask darkened using aluminium foil, 3 g of polyethercarbonate polyol from comparative example 4 and 0.003 g of bis(2,4,6-trimethylbenzoyl)phenylphosphine oxide were mixed.

Radical Crosslinking of Polyethercarbonate Polyols with UV Irradiation

The crosslinking with UV irradiation was carried out on a Physica MCR 501 rheometer from Anton Paar, equipped with a D-PP15 measuring system (plate/plate configuration with a plate spacing of 1 mm). A sample (0.4 g) of each of the mixtures of polyethercarbonate polyol with polyfunctional mercaptans was mixed on the rheometer plate of the rheometer, and subjected to 10% shearing at 25° C. with a dynamic oscillation of 1 Hz. The sample was at the same time subjected to UV irradiation. The radiation source used was an Omnicure Series 1000 mercury lamp from Lumen Dynamics with a power of 100 W. 320-500 nm was selected as filter option. Measurement took place four times a second over two minutes, the parameters measured being the storage modulus and loss modulus. The gel point selected was the point in time at which storage modulus (G') and loss modulus (G") are equal in magnitude (G'/G"=1).

Example 1B: Curing of a Mixture of Terpolymer, Electron-Rich, 2.6 mol % Allyl Glycidyl Ether+Polyfunctional Mercaptan 0.4 g of the mixture from example 1A was used and was irradiated with UV light with an irradiation intensity of 5.1 W/cm$^2$. The gel point occurred after 49 seconds.

Example 2B: Curing of a Mixture of Terpolymer, Electron-Rich, 6.4 mol % Allyl Glycidyl Ether+Polyfunctional Mercaptan 0.4 g of the mixture from example 2A was used and was irradiated with UV light with an irradiation intensity of 5.1 W/cm$^2$. The gel point occurred after 13 seconds.

Example 3B: Curing of a Mixture of Terpolymer, Electron-Rich, 13.6 mol % Allyl Glycidyl Ether+Polyfunctional Mercaptan 0.4 g of the mixture from example 3A was used and was irradiated with UV light with an irradiation intensity of 5.1 W/cm$^2$. The gel point occurred after 6 seconds.

Example 4B (Comparative): Curing of a Mixture of Copolymer Without Double Bonds+Polyfunctional Mercaptan 0.4 g of the mixture from comparative example 4A was used and was irradiated with UV light with an irradiation intensity of 5.1 W/cm$^2$. No gel point was observed.

TABLE 1

Comparison of the results from examples 1B to 4B

| Example | Mixture | Fraction of double bonds in the polyethercarbonate polyol, in mol % | Time taken to attain the gel point, in seconds |
|---|---|---|---|
| 1B | Terpolymer + polyfunctional mercaptan | 2.6 | 49 |
| 2B | Terpolymer + polyfunctional mercaptan | 6.4 | 13 |
| 3B | Terpolymer + polyfunctional mercaptan | 13.6 | 6 |
| 4B (comp.) | Copolymer + polyfunctional mercaptan | — | No curing | comp.: comparative example

A comparison of examples 1B to 3B with comparative example 4B shows that the terpolymers cure by irradiation with UV light, whereas the copolymer without incorporation of allyl glycidyl ether does not undergo curing. With a larger proportion of incorporated allyl glycidyl ether, the time taken to reach the gel point falls from 49 s (example 1B) to 6 s (example 3B).

Curing with Variation in the Intensity of Irradiation

Example 2B-1: Curing of a Mixture of Terpolymer, Electron-Rich, 6.4 mol % Allyl Glycidyl Ether+Polyfunctional Mercaptan 0.4 g of the mixture from example 2A was used and was irradiated with UV light with an irradiation intensity of 5.1 W/cm$^2$. The gel point occurred after 13 seconds.

Example 2B-2: Curing of a Mixture of Terpolymer, Electron-Rich, 6.4 mol % Allyl Glycidyl Ether+Polyfunctional Mercaptan 0.4 g of the mixture from example 2A was used and was irradiated with UV light with an irradiation intensity of 10.9 W/cm$^2$. The gel point occurred after 8 seconds.

Example 2B-3: Curing of a Mixture of Terpolymer, Electron-Rich, 6.4 mol % Allyl Glycidyl Ether+Polyfunctional Mercaptan 0.4 g of the mixture from example 2A was used and was irradiated with UV light with an irradiation intensity of 16.8 W/cm$^2$. The gel point occurred after 5.5 seconds.

Example 2B-4: Curing of a Mixture of Terpolymer, Electron-Rich, 6.4 mol % Allyl Glycidyl Ether+Polyfunctional Mercaptan 0.4 g of the mixture from example 2A was used and was irradiated with UV light with an irradiation intensity of 22.7 W/cm. The gel point occurred after 3 seconds.

Example 2B-5 (Comp.): Curing of a Mixture of Terpolymer, Electron-Rich, 6.4 mol % Allyl Glycidyl Ether+Polyfunctional Mercaptan Without Irradiation with UV Light 0.4 g of the mixture from example 2A was used. There was no UV irradiation. No gel point was observed.

TABLE 2

Comparison of the results from examples 9 to 13

| Example | Intensity of UV light in W/cm² | Time taken to attain the gel point, in seconds |
|---|---|---|
| 2B-1 | 5.1 | 13 |
| 2B-2 | 10.9 | 8 |
| 2B-3 | 16.8 | 5.5 |
| 2B-4 | 22.7 | 3 |
| 2B-5 (comp.) | 0 | No curing | comp.: comparative example

A comparison of examples 2B-1 to 2B-4 shows that when the irradiation intensity goes up, the time taken to reach the gel point goes down. Without UV irradiation, the mixture is not cured within the measurement period (comparative example 2B-5).

The invention claimed is:

1. A process for preparing mercapto-crosslinked polyethercarbonates comprising reacting a polyethercarbonate polyol comprising double bonds with a polyfunctional mercaptan and/or sulfur with the involvement of initiator compounds, wherein the polyethercarbonate polyol comprises a fraction of unsaturated comonomers of greater than or equal to 0.1 mol % and less than or equal to 50 mol %, based on the total amount of comonomers in the polyethercarbonate polyol.

2. The process as claimed in claim 1, wherein the preparation of the polyethercarbonate polyol comprising double bonds comprises the steps of:
(α) initially introducing a catalyst and
(αα) a suspension medium which contains no H-functional groups and/or
(αβ) an H-functional starter compound,
(γ) metering in carbon dioxide and
at least two epoxides, with at least one of the two epoxides having a double bond, or
an epoxide and an unsaturated cyclic anhydride.

3. The process as claimed in claim 2, further comprising step (β) between step (α) and step (γ):
(β) metering in at least one epoxide, wherein the epoxide(s) metered in step (γ) are identical or different from the epoxide or epoxides metered in step (β).

4. The process as claimed in claim 2, wherein the catalyst is a DMC catalyst.

5. The process as claimed in claim 2, wherein one or more unsaturated cyclic anhydrides are metered in step (γ), and wherein the unsaturated cyclic anhydrides metered in step (γ) are selected from the group consisting of 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride, and octadecenylsuccinic anhydride.

6. The process as claimed in claim 2, wherein one or more unsaturated cyclic anhydrides are metered in step (γ), and wherein the unsaturated cyclic anhydrides metered in step (γ) are a compound of formulae (IX), (X) or (XI):

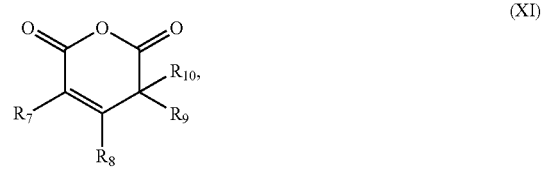

where $R^1$-$R^{10}$ independently of one another are hydrogen, halogen, C1-C22 alkyl or C6-C14 aryl radicals.

7. The process according to claim 2, wherein the epoxides with double bonds that are metered in step (γ) are selected from the group consisting of allyl glycidyl ether, vinylcyclohexene oxide, cyclooctadiene monoepoxide, cyclododecatriene monoepoxide, butadiene monoepoxide, isoprene monoepoxide, and limonene oxide.

8. The process as claimed in claim 1, wherein the polyethercarbonate polyol comprises a fraction of unsaturated comonomers of greater than or equal to 0.5 mol % and less than or equal to 15 mol %, based on the total amount of comonomers in the polyethercarbonate polyol.

9. The process as claimed in claim 1, wherein the polyfunctional mercaptan is selected from the group consisting of diesters of trimethylolpropane with 3-mercaptopropionic acid, triesters of trimethylolpropane with 3-mercaptopropionic acid, diesters of trimethylolpropane with 2-mercaptopropionic acid, triesters of trimethylolpropane with 2-mercaptopropionic acid, diesters of trimethylolethane with 3-mercaptopropionic acid, triesters of trimethylolethane with 3-mercaptopropionic acid, diesters of trimethylolethane with 2-mercaptopropionic acid, triesters of trimethylolethane with 2-mercaptopropionic acid, diesters of glycerol with 3-mercaptopropionic acid, triesters of glycerol with 3-mercaptopropionic acid, diesters of glycerol with 2-mercaptopropionic acid, triesters of glycerol with 2-mercaptopropionic acid, diesters of pentaerythritol with 3-mercaptopropionic acid, triesters of pentaerythritol with 3-mercaptopropionic acid, tetraesters of pentaerythritol with 3-mercaptopropionic acid, diesters of pentaerythritol with 2-mercaptopropionic acid, triesters of pentaerythritol with 2-mercaptopropionic acid, and tetraesters of pentaerythritol with 2-mercaptopropionic acid.

10. The process as claimed in claim 1, wherein the initiator compound is selected from the group consisting of photoinitiators, peroxides, azo compounds, metal-activated peroxides, and redox initiators.

11. The process as claimed in claim 1, wherein the ratio of double bonds to mercapto groups is greater than or equal to 1:1 and less than or equal to 10:1.

12. A mercapto-crosslinked polyethercarbonate obtained by the process as claimed in claim 1.

13. The mercapto-crosslinked polyethercarbonate as claimed in claim 12, wherein comprising starting the reaction by UV irradiation with an intensity of greater than or equal to 5 W/cm$^2$ and less than or equal to 40 W/cm$^2$.

14. A sealant, adhesive, coating material, or thermoset molding comprising a mercapto-crosslinked polyethercarbonate as claimed in claim 12 as sealant, adhesive, coating material, or thermoset molding.

15. A molding comprising a layer comprising a mercapto-crosslinked polyethercarbonate as claimed in claim 12.

16. The process as claimed in claim 1, wherein the polyfunctional mercaptan comprises pentaerythritol tetra-3-mercaptopropionate.

17. The process as claimed in claim 1, wherein the ratio of double bonds to mercapto groups is greater than or equal to 1:1 and less than or equal to 2:1.

\* \* \* \* \*